United States Patent
Wu et al.

(10) Patent No.: US 9,787,160 B2
(45) Date of Patent: Oct. 10, 2017

(54) FAULT-TOLERANT ELECTRICAL GENERATOR OPERABLE WITH PARTIAL POWER

(71) Applicant: ABB Research Ltd., Zurich (CH)

(72) Inventors: Dezheng Wu, Shanghai (CN); Lars Gertmar, Vasteras (SE); Waqas Arshad, Raleigh, NC (US); Cedric Monnay, Molndal (SE); Magnus Byggnevi, Eskilstuna (SE); Frederic Tholence, Vasteras (SE)

(73) Assignee: ABB Research Ltd., Zurich (CH)

( * ) Notice: Subject to any disclaimer, the term of this patent is extended or adjusted under 35 U.S.C. 154(b) by 1073 days.

(21) Appl. No.: 13/788,848

(22) Filed: Mar. 7, 2013

(65) Prior Publication Data

US 2013/0181553 A1    Jul. 18, 2013

Related U.S. Application Data

(63) Continuation of application No. PCT/EP2010/063103, filed on Sep. 7, 2010.

(51) Int. Cl.
*H02K 7/18* (2006.01)
*H02K 19/26* (2006.01)
(Continued)

(52) U.S. Cl.
CPC .......... *H02K 7/183* (2013.01); *H02K 7/1838* (2013.01); *H02K 9/005* (2013.01); *H02K 19/26* (2013.01);
(Continued)

(58) Field of Classification Search
CPC ...... H02K 7/1838; H02K 19/26; H02K 55/02; H02K 7/183; H02K 9/005; H02P 29/021;
(Continued)

(56) References Cited

U.S. PATENT DOCUMENTS

| 3,803,466 A * | 4/1974 | Starkey ................. B60L 15/005 104/292 |
| 6,430,940 B1 * | 8/2002 | Gonzalez ................ A63J 5/025 62/50.2 |

(Continued)

FOREIGN PATENT DOCUMENTS

| CN | 85201030 U | 2/1986 |
| EP | 0805545 A1 | 11/1997 |

(Continued)

OTHER PUBLICATIONS

International Search Report and Written Opinion of the International Searching Authority Application No. PCT/EP2010/063103 dated Jun. 17, 2011; dated Jun. 27, 2011 11 pages.

*Primary Examiner* — Naishadh Desai
(74) *Attorney, Agent, or Firm* — Whitmyer IP Group LLC

(57) ABSTRACT

An electrical machine with a rotor or the stator including a plurality of discrete field modules, and the other one of the rotor and the stator including a plurality of armature coils connected to different power converters. Each field module includes one or more field coils which can be activated independent of the field coils of the neighbouring field modules. When at least one of the field coils is inactivated, e.g. because of a defect, each of the power converters is allowing less power to pass through when an armature coil connected to it is moving over an inactivated field coil, and more power to pass through when the armature coil connected to it is moving over an activated field coil.

13 Claims, 4 Drawing Sheets

(51) Int. Cl.
*H02K 55/02* (2006.01)
*H02K 9/00* (2006.01)
*H02P 29/032* (2016.01)
*H02P 29/024* (2016.01)
*H02K 3/28* (2006.01)
*H02K 11/04* (2016.01)

(52) U.S. Cl.
CPC ......... *H02K 55/02* (2013.01); *H02P 29/0241* (2016.02); *H02P 29/032* (2016.02); *H02K 3/28* (2013.01); *H02K 11/046* (2013.01); *H02K 2213/06* (2013.01); *H02K 2213/12* (2013.01); *Y02E 10/725* (2013.01); *Y02E 40/622* (2013.01)

(58) Field of Classification Search
CPC . H02P 29/022; F03D 9/02; F03D 7/00; F17C 3/025; F17C 6/00; F17C 9/00; H02J 4/00; C25B 1/04; C25B 9/18; C25B 15/02
USPC ........................................ 310/53; 290/44, 55
See application file for complete search history.

(56) References Cited

U.S. PATENT DOCUMENTS

| | | | |
|---|---|---|---|
| 6,492,756 B1 | 12/2002 | Maslov et al. | |
| 7,109,600 B1 | 9/2006 | Bywaters et al. | |
| 2003/0137149 A1* | 7/2003 | Northrup | F03D 9/002 290/44 |
| 2004/0119427 A1* | 6/2004 | Stridsberg | H02K 3/28 318/400.29 |
| 2005/0040724 A1 | 2/2005 | Maguire et al. | |
| 2007/0236186 A1 | 10/2007 | Patterson | |
| 2008/0164697 A1* | 7/2008 | Schram | F03D 7/02 290/44 |
| 2008/0197633 A1* | 8/2008 | Laskaris | F03D 9/002 290/44 |
| 2010/0033037 A1 | 2/2010 | Laskaris et al. | |

FOREIGN PATENT DOCUMENTS

| | | |
|---|---|---|
| EP | 0909002 A2 | 4/1999 |
| JP | 62185579 A | 8/1987 |

* cited by examiner

FAULT-TOLERANT ELECTRICAL GENERATOR OPERABLE WITH PARTIAL POWER

FIELD OF THE INVENTION

The present invention relates to an electrical machine with critical components arranged in modules, the electrical machine being operable with a partial power when one or more of the component modules fail. The present invention further relates to a method for operating an electrical machine with a partial power.

BACKGROUND OF THE INVENTION

When designing a wind turbine generator system (WTGS), the designer must choose between different generator concepts such as direct-drive/gearbox and electrical excitation/permanent magnet. A direct-drive generator is generally considered to be more reliable than one with a gearbox since gearboxes tend to have very limited service life in wind turbine applications. Moreover, direct-drive generators operate in variable speed and therefore generate more energy for a given wind speed, they have minimal losses due to transmission of torque from the turbine blades to the generator, and they can easily control active and reactive power. Because of their mechanical reliability, direct-drive generators are especially suitable for far-away wind power plants such as off-shore plants where the need for long service intervals is obvious. In wind turbine applications which are characterized by high torque and low speed the major drawbacks of direct-drive generators are high cost and large size i.e. poor torque density.

In order to improve the torque density of direct-drive wind turbine generators, high magnetic flux density is achieved by using electrical excitation rather than permanent magnets. To further reduce the dimensions of the machine and in order to avoid copper losses, superconducting generators are developed. US2008/0197633 discloses a generator comprising a stationary superconducting field winding surrounded by a rotating armature winding. The field winding comprises a plurality of superconducting coils which are housed in a large cryostat to cool the coils below the transition temperature i.e. the temperature below which the electrical conductor material of the coils becomes superconducting.

One problem with the prior art generators described above is that their electrical components are sensitive for defects. Such defects may occur in the field windings, armature windings, related power electronics, an eventual cryostat and a transformer. If one of these components fails, the whole generator becomes useless and needs to be repaired before an operation of the wind turbine can be resumed. Another problem is that required maintenance actions become excessive when a whole rotor, a stator, one large power converter, one large cryostat or one large transformer needs to be replaced or repaired.

A service-friendly electrical motor is known from EP0909002 which discloses a stator divided into a plurality of magnetic stator units, each unit being independent and removable in axial direction. This motor can be operated even when failed magnetic stator units are disconnected, and the output power can be restricted by actively disconnecting part of the magnetic stator units. The motor disclosed in EP0909002 is of a permanent magnet type and can therefore not experience electrical defects in the excitation part of the motor.

SUMMARY OF THE INVENTION

One object of the invention is to provide a wind turbine generator system which is fault-tolerant such that the operation of the wind turbine can be resumed with a partial power even if some of the electrical components have failed.

A further object of the invention is to provide a method for automatically diagnosing a generator failure and resuming the operation of a wind turbine with a partial power.

A yet further object of the invention is to provide a wind turbine generator system which is easy and fast to repair by using reasonably sized spare parts.

These objects are achieved by an electrical machine and a method for operating an electrical machine.

The invention is based on the realization that by using a modular structure for the critical components of the generator, and by providing the generator with a smart controller comprising fault diagnosis and restart sequences, the generator operation can be resumed with a partial power when some of the component modules have failed. This can be done automatically without the need of personal attending the power plant and without the need of inserting any spare parts.

According to a first aspect of the invention, there is provided an electrical machine which comprises a rotor and a stator. The rotor is rotatable in relation to the stator about a rotational axis. One of the rotor and the stator comprises a plurality of discrete field modules arranged adjacent to each other about the rotational axis and configured to create a magnetic field for an armature to interact with. The other one of the rotor and the stator comprises a plurality of armature coils, at least two of the armature coils being connected to different power converters. Each field module comprises one or more field coils which can be activated independent of the field coils of the neighbouring field modules. When at least one of the field coils is inactivated, each of the power converters is allowing less power to pass through when an armature coil connected to it is moving over an inactivated field coil, and more power to pass through when the armature coil connected to it is moving over an activated field coil. By these measures the electrical machine can continue its operation with a partial power even if some of the field coils fail.

According to one embodiment of the invention, at least one field coil comprises a superconducting material. When superconducting material is used in the field coils, the field modules become easily manageable because of their reduced dimensions.

According to one embodiment of the invention, the electrical machine comprises a plurality of cryostats for keeping the temperature of the superconducting material below a transition temperature. By providing the electrical machine with a plurality of cryostats a failure at a cryostat limits the defect to field coils within that cryostat.

According to one embodiment of the invention, each field module comprises an individual cryostat. By providing each field module with an individual cryostat a failure at a cryostat further limits the defect to that field module.

According to one embodiment of the invention, the cryostats are housed inside a vacuum vessel. By housing the cryostats inside a vacuum vessel the heat conduction from the cold components to the surroundings is minimized.

According to one embodiment of the invention, the cryostats are attached to vacuum vessel walls via load bearing plates extending in the direction of the rotational axis and being supported against the vacuum vessel walls only by part of their periphery. By this measure the heat conducting area is minimized.

According to one embodiment of the invention, the load bearing plates are supported against the vacuum vessel walls only by their short sides. By this measure the heat conducting distance is maximized.

According to one embodiment of the invention, the load bearing plates are made of fibre reinforced plastics or Inconel®. These are the preferred materials because of their load bearing quality combined with low thermal conductivity.

According to one embodiment of the invention, the number of the field modules is at least 4, such as 8, 12 or 24. A large number of field modules increase the number of increments of the partial power with which the turbine can be operated.

An electrical machine according to the present teachings may have the generator overdimensioned with regard to normal wind conditions. By this measure the efficiency of the generator is better during a fault-free operation under normal wind conditions, and during an operation at partial power the generator may still be able to generate a power corresponding to the normal wind conditions.

According to a second aspect of the invention, there is provided a method for operating an electrical machine with partial power. The electrical machine comprises a rotor and a stator, the rotor being rotatable in relation to the stator about a rotational axis. One of the rotor and the stator comprises a plurality of discrete field modules arranged adjacent to each other about the rotational axis and configured to create a magnetic field for an armature to interact with. The other one of the rotor and the stator comprises a plurality of armature coils, at least two of the armature coils being connected to different power converters. The method comprises the steps of: providing each field module with one or more field coils which can be activated independent of the field coils of the neighbouring field modules; inactivating at least one of the field coils; and configuring each power converter to allow less power to pass through when an armature coil connected to it is moving over an inactivated field coil, and more power to pass through when the armature coil connected to it is moving over an activated field coil. By these measures the electrical machine can continue its operation with a partial power even if some of the field coils fail.

BRIEF DESCRIPTION OF THE DRAWINGS

The invention will be explained in greater detail with reference to the accompanying drawings, wherein.

DETAILED DESCRIPTION OF THE INVENTION

Figure 1A:
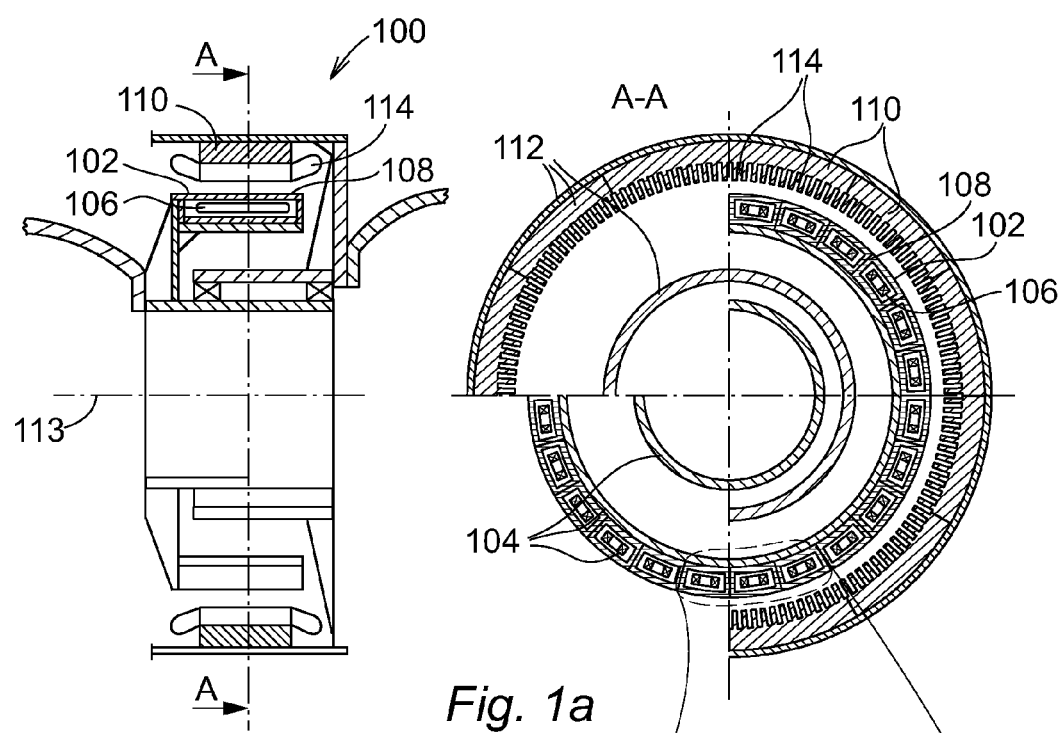
FIGS. 1a and 1b show a cross-sectional side view of a wind turbine generator according to one embodiment of the invention.
Figure 1B:
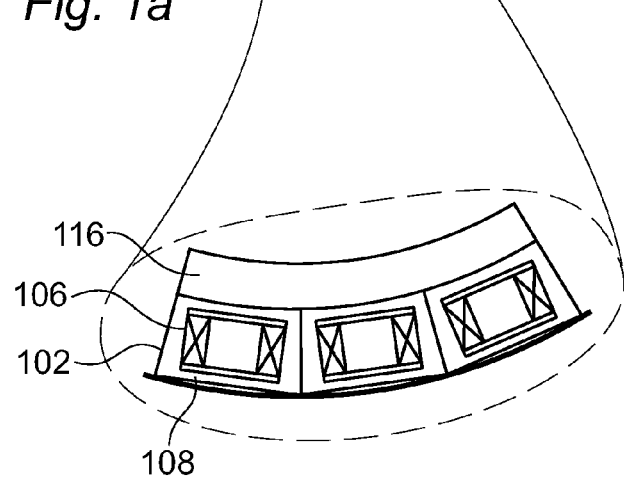

Referring to FIGS. 1a and 1b, a wind turbine generator 100 is shown wherein twenty-four discrete field modules 102 are arranged to form a cylinder at an outer periphery of a stator 104 of the generator 100. The field modules 102 are configured to create a magnetic field with which an armature interacts. Each field module 102 comprises one field coil 106 consisting of high temperature superconducting (HTS) material and being housed inside a cryostat 108. The stator 104 thereby has twenty-four poles i.e. twelve pole pairs. The pole pairs are arranged radial opposite to each other, and in a case of a defect the poles are disconnected pair-wise in order to avoid unbalanced magnetic forces. FIG. 1b shows a magnified section of three field modules 102 assembled on a stator back iron 116.

Figure 2:
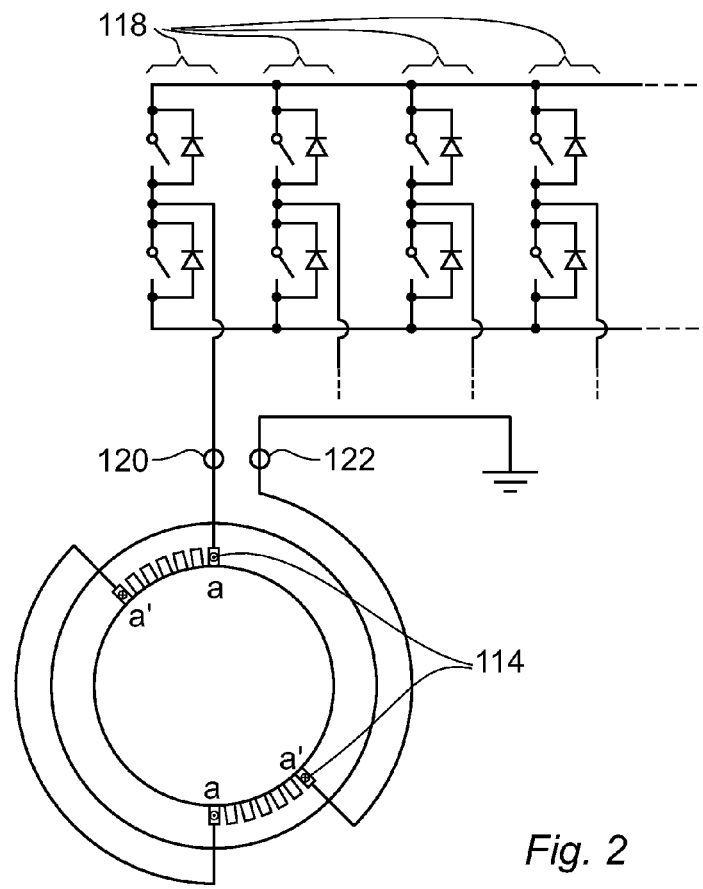
FIG. 2 is a schematic drawing illustrating the armature coil connections.

The cylinder of field modules 102 is encircled by twelve armature winding modules 110 arranged in a rotor 112 of the generator 100. The rotor 112 is rotatable in relation to the stator 104 about a rotational axis 113. Each armature winding module 110 comprises six armature coils 114 corresponding to six electrical phases a-f. In FIG. 2 two sections of armature windings are illustrated schematically in order to show how the armature coils 114 may be connected. Each armature coil 114 and its radial opposite pair are connected in series to a power converter leg 118 via a slip ring 120. Each such pair of radial opposite armature coils 114 is connected to an individual power converter leg 118 via an individual slip ring 120. The total number of slip rings 120 is therefore equal to the number of armature coil pairs plus one ground slip ring 122 for a ground connection. The armature coils 114 can also be connected modularly i.e. each of the radial opposite armature coils 114 can be connected to an individual converter leg 118. Furthermore, the radial opposite armature coils 114 can be connected in parallel to a common converter leg 118. A drawback with connecting the armature coils 114 modularly is that the number of slip rings 120 is doubled, and a drawback with connecting the armature coils 114 in parallel is that the radial opposite armature coils 114 experience different electromotive forces (emf) if one of the field modules 102 fails.

Figure 3:
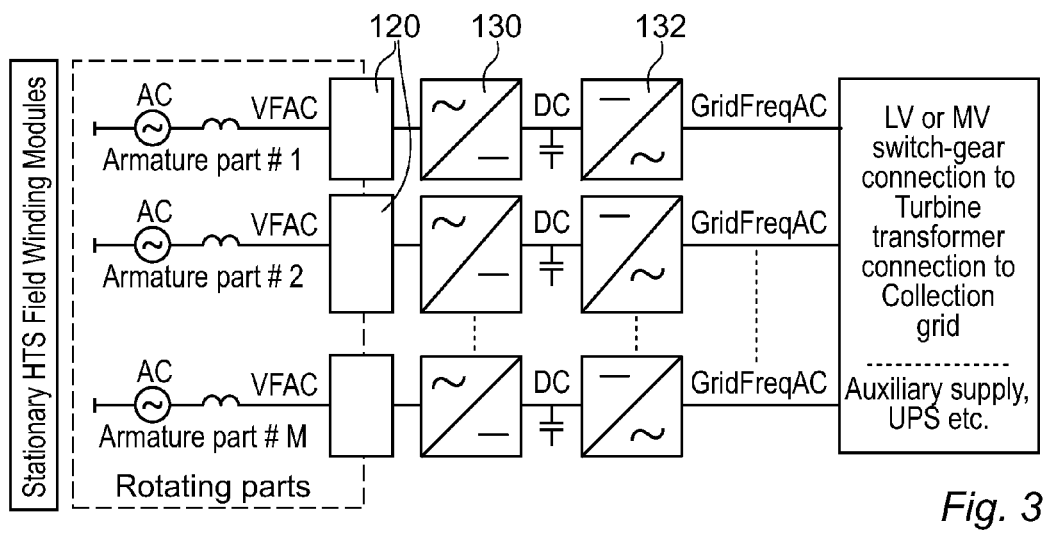
FIG. 3 is a schematic drawing illustrating the power conversion.

A schematic drawing illustrating the power conversion is shown in FIG. 3. A power converter leg 118 comprises an active rectifier unit 130 for converting the alternating current (AC), or more precisely the variable frequency alternating current (VFAC), from the armature coil 114 into direct current (DC). After the rectifier unit 130 there is a grid inverter unit 132 for converting the DC to AC corresponding to the grid frequency. Both the rectifier unit 130 and the inverter unit 132 use pulse width modulation (PWM) for controlling the amount of power passing through each of the units. The power converter output is ultimately connected to a main power grid via a switch gear, a power transformer and a collection grid. Part of the power converter output is used to power the field coils 106.

Figure 4:
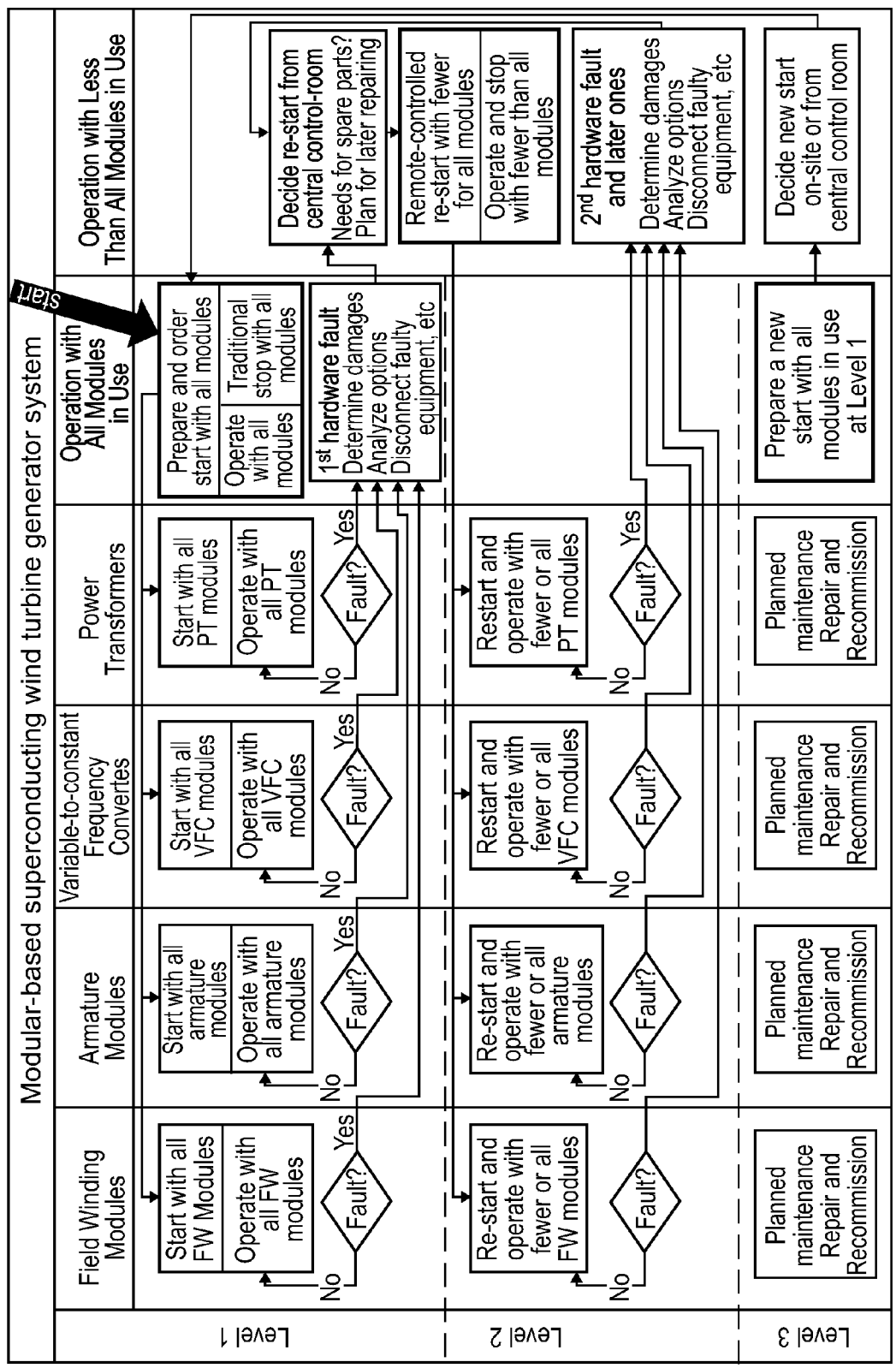
FIG. 4 shows an automation diagnosis block diagram.

In order to be able to control a partially failed generator 100 in an appropriate way, the WTGS needs a controller which is able to gather information about failed component modules and can adjust the control accordingly. According to FIG. 4, the controller receives information about the status of the field coils 106, armature coils 114, power converters and power transformers. The status information is generated by measuring current in the respective components. When a fault is detected, the system acts according to a sequence determined in advance. The faulty equipment can for example be inactivated by disconnecting it, and the operation of the WTGS can be continued with a partial power. Information about the disconnected equipment is stored in the controller, and the control is adapted to the new operation circumstances. The software controlling the fault diagnosis and restart sequences can be updated at any time at distance via a communication link between the controller and a monitoring room. These sequences may be fully automatic or alternatively may require input from an operator sitting in the monitoring room and communicating with the controller via the communication link.

In the case of a superconducting generator 100 it is the field modules 102 that are the most vulnerable components since they are complicated and represent quite a new field of technology while the other components represent more established technology. Under a fault-free operation the field coils 106 generate an equal fundamental electromotive force (emf) in each armature coil 114. All the rectifier units 130 modulate the supply voltage substantially identically in order to let the amount of power corresponding to the emf to pass through. When one of the field coils 106 fails, however, the fundamental emf between different armature coils 114 becomes unequal because the failed field coil 106 does no generate any flux. This defect is detected by the controller and the failed field coil 106 and its radial opposite pole pair are disconnected. Since each pair of radial opposite armature coils 114 is connected to an individual rectifier, the PWM duty cycle for the supply voltage can be modulated to correspond to the lower fundamental emf in the pair of armature coils 114 which are moving over the inactivated field coils 106. The phase of the current vector is thereby maintained and reverse current is prohibited.

If the aforementioned defect would occur in a conventional electrical machine where all the armature coils 114 are connected in a series/parallel combination to one power converter, the different emfs would cause the current to circulate through the armature coils 114 with lower emf. The same would happen even with individual power converters if the PWM duty cycle for the supply voltage is not adjusted to the fault circumstances. This cannot be allowed since the circulating currents cause overheating and may become high enough to permanently damage the armature coils 114.

The partial power with which the operation of the wind turbine can be resumed depends not only on the number of failed components but also on the total number of component modules. Using the earlier example with twenty-four discrete field modules 102 each comprising one field coil 106, in a case of one field coil 106 failing the generator 100 can be operated with partial power corresponding to 22/24 of the maximal power provided that rest of the power transmission chain of the WTGS supports the possibility to disconnect only the failed coil and its radial opposite pole pair. This implies that each pair of radial opposite armature coils 114 moving over a radial opposite pair of inactivated field coils 106 is connected to an individual power converter leg 118 via an individual slip ring 120.

In the case of twelve armature winding modules 110 with six electrical phases, and each pair of radial opposite armature coils 114 connected to a common power converter leg 118, the number of required power converter legs 118 and corresponding slip rings becomes thirty-six. As a large number of these components may become both impractical and expensive, one can consider either reducing the number of phases or reducing the number of increments of the partial power with which the turbine can be operated. For example, two pairs of armature coils 114 can be connected in parallel to a common power converter leg 118, reducing the number of required slip rings 120 and power converter legs 118 to 18. When this is done, in the case one field coil 106 failing not only the failed coil and its radial opposite pole pair have to be disconnected, but so must also the field coils 106 corresponding to the other pair of parallel connected armature coils 114. Consequently, the operation of the generator 100 can be continued with partial power corresponding only to 20/24 of the maximal power.

Alternatively, in order to drastically reduce the number of slip rings 120, the rectifier part of the power conversion can be introduced into the rotor 112. Consequently, only one slip ring 120 and a ground slip ring 122 are needed to transmit the resulting DC current from the rotor 112.

As explained hereinbefore, the fault-tolerance of the WTGS depends on the whole chain of components from the field coils 106 to the power converter. While the number of parallel connected armature coils 114 and the corresponding number of slip rings 120 and power converter legs 118 affect the partial power increments resulting from a field coil defect, the number of these components affects also directly the fault-tolerance of the WTGS. A large number of independent armature coils 114, slip rings 120 and power converter legs 118 improve the overall fault-tolerance of the WTGS since these components themselves may also experience defects. Furthermore, the chain of vulnerable components does not end at the power converter but any subsequent component such as a power transformer can also be rendered modular in order to improve the overall fault-tolerance of the WTGS. On the other hand, as explained before, a large number of components may become both impractical and expensive.

A wind turbine generator 100 is expected to generate certain power depending on the wind conditions, and conventionally the generator 100 is dimensioned such that its nominal power corresponds to normal wind conditions. With a generator 100 according to the present invention it may turn out to be advantageous to overdimension the generator 100. On one hand the efficiency of an overdimensioned generator 100 is better during a fault-free operation under normal wind conditions. On the other hand during an operation at partial power the generator 100 may still be able to generate a power corresponding to the normal wind conditions.

Figure 5:
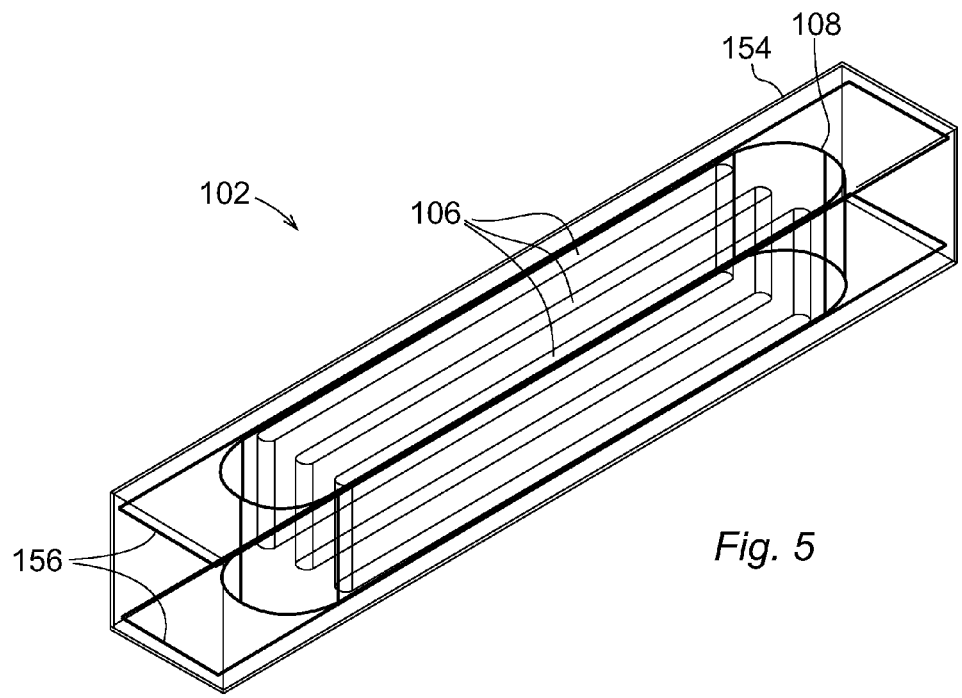
FIG. 5 shows an embodiment of a field module.

FIG. 5 shows an embodiment of a field module 102 suitable for being introduced into an electrical machine according to the invention. The field module 102 comprises three field coils 106 consisting of HTS material. The field coils 106 are enclosed inside a cryostat 108 which in its turn is housed inside a vacuum vessel 154 for minimizing heat conduction from the cold components to the surroundings. The field coils 106 are supported by mandrels (not shown) for transmitting the force from the field coils 106 to cryostat walls and further to load bearing plates 156. The mandrel may be made of ferromagnetic material (e.g. iron or electrical steel) or non-magnetic material such as fibre reinforced plastics (FRP). The load bearing plates are made of FRP or Inconel® or another load bearing material with low thermal conductivity, and they transmit the force further to the vacuum vessel walls. The load bearing plates extend in a longitudinal direction of the vacuum vessel and are supported against the vacuum vessel walls only by their short sides for minimizing the heat conducting area and for maximizing the heat conducting distance. Alternatively, a series of small supports may be placed between the cryostat walls and the vacuum vessel walls to transmit the force. The vacuum vessel is preferably made of stainless steel.

Figure 6:
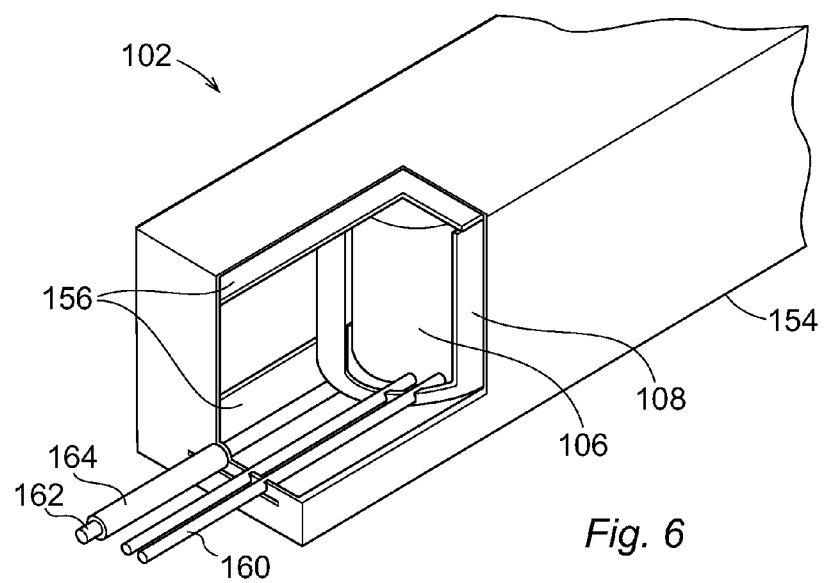
FIG. 6 shows another embodiment of a field module.

FIG. 6 shows an embodiment of a field module 102 with only one field coil 106. Also current conductors 160, a helium pipe 162 and a vacuum pipe 164 are illustrated. In operation, a vacuum is created inside the vacuum vessel, and helium is circulated between the cryostat interior and a re-condenser (not shown).

The invention is not limited to the embodiments shown above, but the person skilled in the art may, of course, modify them in a plurality of ways within the scope of the invention as defined by the claims.

What is claimed is:

1. An electrical machine operable with partial power, said electrical machine comprising a rotor and a stator, the rotor being rotatable in relation to the stator about a rotational axis,
    one of the rotor and the stator comprising a plurality of field modules arranged adjacent to each other about the rotational axis and configured to create a magnetic field for an armature to interact with, and
    the other one of the rotor and the stator comprising a plurality of armature coils, at least two of the armature coils being connected to different power converters,
    wherein each field module comprises one or more field coils which are configured to be activated independent of the one or more field coils of the neighboring field modules, wherein when at least one of the field coils is inactivated, each power converter provides for less power to pass through when one of the armature coils connected to the respective power converter is moving over an inactivated field coil, and for more power to pass through when the one of the armature coils connected to the respective power converter is moving over an activated field coil.

2. The electrical machine according to claim 1, wherein at least one field coil comprises a superconducting material.

3. The electrical machine according to claim 2, wherein the electrical machine comprises a plurality of cryostats for keeping the temperature of the superconducting material below a transition temperature.

4. The electrical machine according to claim 3, wherein each field module comprises an individual cryostat.

5. The electrical machine according to claim 3, wherein the cryostats are housed inside a vacuum vessel.

6. The electrical machine according to claim 5, wherein the cryostats are attached to vacuum vessel walls via load bearing plates extending in the direction of the rotational axis and being supported against the vacuum vessel walls only by part of their periphery.

7. The electrical machine according to claim 6, wherein the load bearing plates are supported against the vacuum vessel walls only by their short sides.

8. The electrical machine according to claim 6, wherein the load bearing plates are made of fibre reinforced plastics.

9. The electrical machine according to claim 1, wherein the number of the field modules is at least 4.

10. The electrical machine according to claim 1, wherein the generator is overdimensioned with regard to normal wind conditions.

11. A method of operating an electrical machine operable with partial power, the electrical machine comprising a rotor and a stator, the rotor being rotatable in relation to the stator about a rotational axis, one of the rotor and the stator comprising a plurality of field modules arranged adjacent to each other about the rotational axis and configured to create a magnetic field for an armature to interact with, the other one of the rotor and the stator comprising a plurality of armature coils, at least two of the armature coils being connected to different power converters, the method comprising the steps of
    providing each field module with one or more field coils which are configured to be activated independent of the one or more field coils of the neighboring field modules;
    inactivating at least one of the field coils; and
    configuring each power converter to provide for less power to pass through when one of the armature coils connected to the respective power converter is moving over an inactivated field coil, and for more power to pass through when the one of the armature coils connected to the respective power converter is moving over an activated field coil.

12. The electrical machine according to claim 6, wherein the load bearing plates are made of an alloy of nickel, chromium and iron.

13. The electrical machine according to claim 6, wherein the load bearing plates are made of alloys.

* * * * *